United States Patent Office 3,515,781
Patented June 2, 1970

3,515,781
COLD CAPSULE
Wallace H. Steinberg, Matawan, N.J., assignor to Johnson & Johnson, a corporation of New Jersey
No Drawing. Filed Oct. 12, 1967, Ser. No. 674,750
Int. Cl. A61j 3/06, 3/07, 9/04
U.S. Cl. 424—37          3 Claims

ABSTRACT OF THE DISCLOSURE

A capsule containing menthol, thymol and an oral decongestant and which upon dissolution in the mouth releases these substances for the alleviation of nasal congestion, running nose or sinus congestion due to the common cold or hayfever.

BACKGROUND OF THE INVENTION

Field of the invention

This invention pertains to compositions for the alleviation of symptoms of the common cold and hayfever, and more particularly a composition in capsule form which upon dissolution in the mouth releases menthol, thymol and an oral decongestant, with resultant alleviation of nasal congestion, running nose or sinus congestion due to the common cold or hayfever.

Description of the prior art

Some compositions in use for the alleviation of the symptoms of the common cold or hayfever are designed to be taken orally and passed into the stomach for systemic absorption. Such compositions usually contain a systemic nasal decongestant. There is a period of time before relief from nasal congestion is observed. Other compositions are used in the form of ointments for topical application within the nostrils. Such compositions may contain menthol, thymol and other agents designed to effect a cooling sensation in the upper respiratory area. Such compositions tend to afford inadequate relief from nasal congestion. Other compositions dispersed in the form of vapor may contain decongestants together with menthol, thymol and other ingredients. The absorption of the decongestant resulting from the topical contact of the vapors with the lining of the nasal passages tends to result in a slow onset of the systemic action of the decongestant. The result is a delay in the prolonged relief afforded.

SUMMARY OF THE INVENTION

Briefly stated, the present invention provides a capsule composed of a water-dispersable substance such as gelatin and containing therein a mixture of menthol, thymol and a nasal decongestant such as phenylephine, ephedrine or B - propanolamine, dissolved in a suitable non-aqueous vehicle such as a non-toxic ingestible vegetable oil. The capsule when placed in the mouth disperses on contact with saliva and releases the non-aqueous solution into the oral cavity. The menthol volatilizes rapidly and penetrates the nasal cavity where a quick relief from nasal and sinus congestion is achieved. The decongestant becomes dispersed in the saliva and is swallowed, absorbed and passed into the bloodstream with resultant rapid systemic action.

The composition provides sequential therapy, with the volatile agents acting topically to provide an immediate effect, followed by the ingestion and absorption of the decongestant, resulting in prolonged systemic action of the decongestant.

The following examples will serve to illustrate the embodiments of my invention, but are not to be construed as limiting the invention.

EXAMPLE

| Liquid center: | Per capsule, mg. |
|---|---|
| Phenylephrine base | 5.5 |
| Menthol | 13.6 |
| Peppermint oil | 16.17 |
| Thymol | 0.002 |
| Mono and di-glycerides (or other oleoginous food ingestible vehicle) | 82.5 |

The phenylephrine base, menthol, peppermint oil and thymol are added to the oleoginous solvent and the mixture is stirred until solution of the components is complete. Peppermint oil contains at least 50 percent of menthol. This menthol is calculated as part of the menthol content of the liquid center composition.

| Capsule shell | Mg. |
|---|---|
| Gelatin | 28.5 |
| Glycerin | 13.25 |
| Water | 2.5 |
| Acacia | 0.21 |
| Methyl paraben (preservative) | 0.096 |
| Propyl paraben (preservative) | 0.024 |
| Combination of menthol, peppermint oil and thymol in proportions used for the liquid center | 0.420 |
| Titanium dioxide | 0.132 |
| FD & C color | 0.186 |

The gelatin, glycerin and water are blended and the acacia is dispersed in the mixture. The preservatives, color and titanium dioxide are added and the mixture is stirred with mild heating until uniform dispersion is achieved.

The presence of a smaller portion of the combination of menthol, peppermint oil and thymol in the gelatin shell serves to prepare the palate for the impact of the liquid center composition containing a substantially larger amount of the same combination.

The capsule shells are formed and filled with the liquid center composition by known methods wherein the shells are either cast or pressed from a preformed sheet or strip and the liquid composition for the center is inserted before the two shell halves are sealed together.

The range of menthol (i.e., combination of d-, l-, or dl-menthol per se and the menthol content of the peppermint oil) is 5–40 mg. by weight per capsule. This is the range found to be effective in providing the initial clearing of the nasal passages prior to the onset of the decongestant.

Other non-aqueous, non-toxic ingestible vehicles may be used in preparing the liquid center composition, including combinations of mono- and di-glycerides such as the acetoglycosides, yellow beeswax, vegetable shortening and soya lecithin and combinations thereof, with the purpose of providing a suitable ingestible solvent for the other ingredients of the liquid center composition. The solvent should be fluid at body temperature.

In place of phenylephrine in the liquid outer composition of this invention, other decongestants such as norepinephrine, ephedrine and B-phenylpropanolamine may be employed. The range of decongestant in the liquid center composition is 3–20 percent by weight per capsule.

What is claimed is:

1. A water dispersible ingestible nasal and sinus congestion alleviating sequential therapy outer gelatin shell capsule containing therein an inner liquid center for release within the oral cavity of a composition comprising a solution of a combination of systemic nasal and sinus decongestant of the group consisting of phenylephrine, norepinephrine, ephedrine and B-phenylpropanolamine with thymol, menthol, and peppermint oil containing menthol in a non-aqueous ingestible solvent, said capsule shell and liquid center together containing a predetermined proportion of an effective amount of menthol to provide by rapid volatilization of the menthol in the oral cavity, and penetration into the nasal cavity, quick relief from nasal and sinus congestion, said menthol producing an initial clearing of the nasal passages prior to the subsequent systemic onset of the decongestion, after ingestion and absorption of the latter, with the further proviso of there being in the outer shell a smaller portion of the combination of menthol, peppermint oil and thymol than a substantially larger amount of the same combination contained in the inner liquid center, said smaller portion in said outer shell being sufficient to prepare the palate for the impact of the liquid center composition containing a substantially larger amount of the same composition.

2. A water-dispersible ingestible capsule containing a liquid center for release within the oral cavity of a composition comprising a solution of 3–20 percent by weight of a decongestant and 5–40 percent by weight of menthol in a non-aqueous ingestible solvent.

3. The composition of claim 2 in which the decongestant is phenylephrine in 5 percent concentration by weight and the menthol concentration is about 20 percent by weight.

References Cited

UNITED STATES PATENTS

| | | | |
|---|---|---|---|
| 2,311,923 | 2/1943 | Lautmann | 424—35 |
| 2,580,683 | 1/1952 | Kreuger | 424—37 |
| 2,780,355 | 2/1957 | Palermo et al. | 424—360 XR |
| 3,126,321 | 3/1964 | Kurtz | 424—37 |

SHEP K. ROSE, Primary Examiner

U.S. Cl. X.R.

424—330, 343